United States Patent
Seseke-Koyro et al.

(10) Patent No.: US 6,880,746 B2
(45) Date of Patent: Apr. 19, 2005

(54) FLUOROSTANNATE-CONTAINING BRAZING OR SOLDERING FLUXES AND USE THEREOF IN BRAZING OR SOLDERING ALUMINUM OR ALUMINUM ALLOYS

(75) Inventors: Ulrich Seseke-Koyro, Isernhagen (DE); Andreas Becker, Lachendorf (DE); Joachim Frehse, Hannover (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 10/259,794

(22) Filed: Sep. 30, 2002

(65) Prior Publication Data

US 2003/0102359 A1 Jun. 5, 2003

Related U.S. Application Data

(63) Continuation of application No. PCT/EP01/03216, filed on Mar. 21, 2001.

(30) Foreign Application Priority Data

Mar. 30, 2000 (DE) .......................... 100 15 486

(51) Int. Cl.⁷ .......................... B23K 1/20; B23K 31/02; B23K 35/34
(52) U.S. Cl. .......................... 228/223; 228/208; 148/23; 148/24
(58) Field of Search .......................... 228/223, 207, 228/208, 214, 218, 224, 31, 42; 148/22–24; 205/139

(56) References Cited

U.S. PATENT DOCUMENTS

| | | | | |
|---|---|---|---|---|
| 3,616,292 A | * | 10/1971 | Wilson | 205/139 |
| 3,622,470 A | * | 11/1971 | Gowman | 205/139 |
| 4,113,580 A | * | 9/1978 | Tsutsui et al. | 205/176 |
| 4,279,605 A | | 7/1981 | Egami | |
| 4,418,053 A | * | 11/1983 | Muhler et al. | 424/52 |
| 4,428,920 A | | 1/1984 | Willenberg et al. | |
| 4,580,716 A | * | 4/1986 | Barresi et al. | 228/219 |
| 4,670,067 A | | 6/1987 | Suzuki et al. | |
| 4,747,218 A | * | 5/1988 | Saint Martin | 34/73 |
| 4,941,929 A | * | 7/1990 | Tecle | 148/24 |
| 4,944,985 A | * | 7/1990 | Alexander et al. | 428/570 |
| 5,100,048 A | | 3/1992 | Timsit | |
| 5,171,377 A | | 12/1992 | Shimizu et al. | |
| 5,190,596 A | | 3/1993 | Timsit | |
| 6,432,221 B1 | * | 8/2002 | Seseke-Koyro et al. | 148/24 |
| 2002/0070263 A1 | * | 6/2002 | Seseke-Koyro et al. | 228/208 |

FOREIGN PATENT DOCUMENTS

| | | |
|---|---|---|
| EP | 0810057 | 3/2001 |
| GB | 1438955 | 6/1976 |
| JP | 2307695 | 12/1990 |
| JP | 02-307695 A * | 12/1990 |
| JP | 03-90276 A * | 4/1991 |
| JP | 3-099771 | 4/1991 |
| JP | 3-099795 | 4/1991 |
| JP | 3-114663 | 5/1991 |
| JP | 3-138081 | 6/1991 |
| JP | 03-138081 A * | 6/1991 |
| WO | WO 98/10887 | 3/1998 |
| WO | WO 99/48641 | 9/1999 |

\* cited by examiner

*Primary Examiner*—Lynne R. Edmondson
(74) *Attorney, Agent, or Firm*—Crowell & Moring LLP

(57) ABSTRACT

Fluxing agents comprising potassium fluorostannate and/or cesium fluorostannate which can be used for brazing or soldering components of aluminum or of an aluminum alloy, even by solderless brazing or soldering. Conventional fluxing agents or other fluorometallates, such as alkali metal fluorozincates and/or alkali metal fluorosilicates, can also be added to the fluorostannate-containing fluxing agent. The fluxing agents of the invention can be applied by either dry or wet fluxing methods.

26 Claims, No Drawings

FLUOROSTANNATE-CONTAINING BRAZING OR SOLDERING FLUXES AND USE THEREOF IN BRAZING OR SOLDERING ALUMINUM OR ALUMINUM ALLOYS

CROSS REFERENCE TO RELATED APPLICATIONS

This application is a continuation of international patent application no. PCT/EP01/03216, filed Mar. 21, 2001, designating the United States of America and published in German as WO 01/74530A, the entire disclosure of which is incorporated herein by reference. Priority is claimed based on Federal Republic of Germany patent application no. DE 100 15 486.7, filed Mar. 30, 2000.

BACKGROUND OF THE INVENTION

The present invention relates to the use of alkali fluorostannates, particularly potassium and cesium fluorostannates as a brazing or soldering fluxing agent or as a constituent of brazing or soldering fluxing agents for components made of aluminum and aluminum alloys, and to new fluxing agents which contain potassium and/or cesium fluorostannate or are made thereof.

Assemblies (for example radiators for automobile engines or heat exchangers) may be manufactured from aluminum parts or parts made of aluminum alloys through brazing (hard soldering) or soldering (soft soldering). For this purpose, fluxing agents based on potassium fluoroaluminate are used. The surfaces of the components to be brazed or soldered to one another are freed from oxidic adherents using these fluxing agents. Such a method is disclosed in British Patent 1 438 955. The production of corresponding fluxing agents is, for example, described by Willenberg, U.S. Pat. No. 4,428,920 and Kawase, U.S. Pat. No. 4,279,605. Fluxing agents which contain cesium fluoroaluminate and possibly also potassium fluoroaluminate are particularly suitable for brazing or soldering aluminum alloys having a higher magnesium content, see Suzuki, U.S. Pat. No. 4,670,067 and Shimizu, U.S. Pat. No. 5,171,377. Instead of a solder metal, a metal which forms a eutectic mixture with the aluminum upon brazing or soldering may also be added to the fluxing agent. Such metals include, for example, copper, zinc, and germanium, and particularly silicon.

The use of solder metal may be completely superfluous if specific metal fluorosilicates are added, see European Patent Application 810 057 and WO 98/10887. In the latter patent application, it is disclosed that a solder metal may be dispensed with if a mixture of potassium fluoroaluminate and potassium fluorosilicate, which contains potassium fluorosilicate in a quantity from 6 to 50 weight-percent, is used.

Finally, using fluxing agents which contain alkali metal fluorozincates is known, see International Patent Application WO 99/48641. In this case, a zinc layer which protects the surface against corrosion forms on the components.

SUMMARY OF THE INVENTION

The object of the present invention is to enlarge the palette of usable fluxing agents for brazing or soldering aluminum and/or aluminum alloys.

It is also an object of the invention to provide an improvement in a method of brazing or soldering aluminum and/or aluminum alloys.

These and other object are achieved in accordance with the present invention by providing a method of brazing or soldering components made of aluminum or an aluminum alloy in which an effective fluxing amount of a fluxing agent comprising at least one alkali metal fluorostannate is applied to at least one of the components to be brazed or soldered.

In accordance with another aspect of the invention the objects are achieved by providing a fluxing agent comprising 5 to 100 weight-percent of at least one fluorostannate selected from the group consisting of potassium fluorostannate and cesium fluorostannate, 0 to 95 weight-percent of at least one hexafluorosilicate selected from the group consisting of potassium hexafluorosilicate and cesium hexafluorosilicate, 0 to 95 weight-percent of at least one fluoroaluminate selected from the group consisting of potassium fluoroaluminate and cesium fluoroaluminate, and 0 to 95 weight-percent of at least one fluorozincate selected from the group consisting of potassium fluorozincate and cesium fluorozincate.

The method according to the present invention for brazing or soldering components made of aluminum or aluminum alloys provides that a fluxing agent is used which contains alkali fluorostannates, preferably potassium and/or cesium fluorostannate.

The present invention will be described in further detail with reference to preferred embodiments in which the fluxing agent comprises potassium and/or cesium compounds.

The term "potassium and cesium fluorostannates" is intended to include all of those compounds which contain potassium and/or cesium (as cations) and anions which are composed of tin and fluorine. The tin may be either divalent tin or tetravalent tin. For the sake of simplicity, fluorine-tin anions of divalent tin are also referred to as fluorostannates in the present invention. For example, trifluorostannates, pentafluorodistannates, and tetrafluorostannates of divalent tin are known. For tetravalent tin, for example, pentafluorostannates and hexafluorostannates are known. The negative charges are correspondingly saturated by potassium and/or cesium cations. If desired, one may, of course, use mixtures, both of different types of cations and different types of anions.

The production of fluorostannates is described in Gmelin's Handbook of Inorganic Chemistry, 8th edition, Vol. Tin C3. The production of the calcium fluorostannates and their hydrates is described on pages 42 to 50, and that of the cesium fluorostannates on pages 143 to 145.

The use of these potassium and/or cesium fluorostannates offers very high flexibility in brazing or soldering.

One embodiment provides that brazing or soldering is performed without adding solder metal (for example in the form of plating on the components or as a solder metal added to the flux in powdered form). For this purpose, pure potassium and/or cesium fluorostannate may be used, for example. The use of a mixture made of potassium and/or cesium fluorostannate and potassium and/or cesium fluorosilicate is also possible. In this case, the proportion of the fluorostannate is advantageously in the range from 5 to 95 weight-percent, particularly 30 to 70 weight-percent.

Alternatively, brazing or soldering may also be performed without solder if fluxing agent mixtures are used which contain potassium and/or cesium fluorostannate and known fluxing agents, particularly based on potassium fluoroaluminate or cesium fluoroaluminate. In this case as well, potassium and/or cesium hexafluorosilicate may also be included if desired. If no fluorosilicate is included, the proportion of fluorostannate is advantageously in the range from 10 to 90 weight-percent, preferably 30 to 70 weight-percent. A part of the fluorostannate, for example a tenth to a third, may be replaced by potassium and/or cesium fluorosilicate. Fluxing agents which contain the potassium and/or cesium fluorostannate together with potassium and/or cesium fluorozincate are also usable as fluxing agents for solder-free brazing or soldering. The proportion of fluorostannate is preferably in the range from 10 to 90 weight-percent, preferably 30 to 70 weight-percent. The remainder up to 100 weight-percent is then formed by the fluorozincate, with potassium and/or cesium fluoroaluminate or potassium and/or cesium fluorosilicate also able to be included if desired. In this case, the fluorosilicate may again replace a part of the fluorostannate; a portion of the fluorozincate, for example one tenth to nine tenths, may be replaced by the aforementioned fluoroaluminates.

Solder-free brazing or soldering has advantages in practice since the working step of introducing solder may be dispensed with.

Naturally, the potassium and/or cesium fluorostannates may also be used in a conventional way for brazing or soldering. For example, the compounds may be used mixed with solder metal or components plated with solder metal may be used. The fluorostannates may also be used mixed with metals which form a eutectic mixture with aluminum during brazing or soldering, as is described in U.S. Pat. Nos. 5,100,048 and 5,190,596.

If desired, the fluorostannates may also be used mixed together with typical fluxing agents. Then, on one hand, they act as a fluxing agent, and, on the other hand, they form a tin layer on the surface during brazing or soldering, which protects the brazed or soldered components from corrosion. For example, known fluxing agents which contain alkali fluoroaluminate, alkali fluorozincate, or mixtures of alkali fluorosilicate and aluminum fluoride may be added. In this case, alkali means potassium or cesium. If only the surface protection property of the fluorostannate is considered important, it is sufficient for the fluxing agent mixture to contain 30 to 70 weight-percent of the fluorostannate. However, the proportion may also be higher, up to nearly 100 weight-percent. If the proportion is lower, up to 10 weight-percent, for example, the surface protection is possibly less pronounced. Mixtures of the fluorostannates and aluminum fluoride are also usable.

The fluxing agent may, as described above, be used as such without adding supplements. Compounds which are ready for use may, however, include supplements in addition to the fluxing agent if desired. For example, binders, dispersion agents, or water and/or organic liquids may be included.

The fluxing agent may be applied in a known manner to the aluminum and/or aluminum alloy components which are to be joined. One variant is dry application. Typically, the dry powder is sprayed onto the components using electrostatic forces. According to another variant, the fluxing agent is applied to the materials to be bonded in the form of a slurry in water or an organic solvent, or even as a paste. These slurries advantageously contain 15 to 75 weight-percent of the fluxing agent. Besides water, organic liquids, particularly alcohols, such as methanol, ethanol, propanol, or isopropanol, or polyols, also may be used to form the slurries. Other organic liquids which may be used include ether, e.g., diethylene glycol monobutyl ether, ketones such as acetone, and esters of monobasic alcohols, diols, or polyols. A suitable binder for the application as a paste is, for example, ethyl cellulose. The fluxing agent may be applied to the component using film formers, typically polymers which are soluble in organic solvents such as acetone. A strongly adhering film results after the solvent evaporates. Suitable polymers include, for example, acrylates or methacrylates.

The brazing or soldering temperature is selected depending on the fluxing agent used and advantageously lies in the range from 270° C. to 620° C., for example 270 to 580° C. The solder or solder-forming metal is selected accordingly. At solder metal liquidization temperatures below 450° C., one refers to soft soldering (="soldering"), according to the definition, and at a temperature above this, one refers to hard soldering (="brazing"). Accordingly, there are low-melting solders and solders which may be used at medium or high temperatures. For example, zinc-aluminum solders have quite a low melting point; pure zinc solder is used for soldering at 420° C. Other solders for high temperatures are aluminum-silicon solders for use above 530° C. and aluminum-silicon-copper solders for use above 575° C. Brazing or soldering is typically performed at ambient pressure. In this case, the flame soldering method may be used, as well as the furnace soldering method. Brazing or soldering may particularly be performed in an inert atmosphere (e.g., nitrogen atmosphere).

The invention also relates to the fluxing agents described herein. In this case, fluxing agents which essentially have particles in a grain size from 8 to 20 μm can be used very well for dry fluxing in brazing or soldering according to the present invention. The stated grain sizes relate to the average grain diameter for 50% of the particles ($X_{D50}$), determined by laser diffraction.

Fluxing agents which consist essentially of particles having a grain size range from 3 to 10 μm can be applied to good effect as a slurry in water or organic liquids according to the wet fluxing method. The stated grain sizes again relate to the average grain diameter of 50% of the particles ($X_{D50}$). The desired fractions may be obtained by pulverizing, compacting, and/or screening.

The present invention additionally relates to mixtures of potassium and cesium fluorostannates, which are also usable as fluxing agents for the method according to the present invention.

The method according to the present invention and the fluxing agents according to the present invention have an array of advantages. They expand the palette of usable fluxing agents. If cesium compounds are added, the brazing or soldering of aluminum alloys containing magnesium is possible. The fluorostannates may be used for solder-free brazing or soldering, optionally with added fluorosilicate. This provides the advantage of saving work, and in addition the surface of the brazed or soldered component is coated. The fluorostannates may also, however, be mixed with conventional fluxing agents or be used while using conventional solders or solder precursors. In this case, the properties of the fluorostannates as a fluxing agent, the properties relating to the formation of a tin-plated surface (coating), or even both properties may be exploited.

DETAILED DESCRIPTION OF PREFERRED EMBODIMENTS

The following examples are intended to further explain the invention, without restricting its scope.

EXAMPLE 1

Production of Potassium Fluorostannate

Reaction:

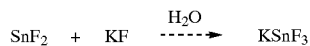

$$SnF_2 + KF \xrightarrow{H_2O} KSnF_3$$

| Batch: 0.1 mole | |
|---|---|
| SnF$_2$ (99%, Aldrich) | 0.1 mole = 15.67 g |
| KF (min 99%, Riedel) | 0.1 mole = 5.81 g |
| Completely deionized (CD) water | ~50 ml |

Procedure:

15.67 g SnF$_2$ was placed in a plastic beaker and dissolved in 35 ml CD water (the solution was turbid). The solution was heated to 60° C. 5.81 g KF was dissolved in 15 ml CD water and metered into the SnF$_2$ solution. As the KF solution was added, a white precipitate precipitated out. The solution was stirred at 60° C. for 1.5 hours. After 1.5 hours, the heating was stopped and stirring was continued for 1 hour. The batch was suction filtered (medium filter), and the precipitate was suctioned dry. The solid was white and metallically glossy, and was dried for 3 days at 75° C. The product was KSn$_2$F$_5$.

Yield: 8.0 g (sample number: AB001901)

EXAMPLE 2

Production of Potassium Fluorostannate through Filtrate Precipitation

The filtrate from Example 1 had approximately 100 ml isopropanol added to it, upon which immediate precipitation occurred. After 3 days, the precipitate was suction filtered and suctioned dry via a medium filter. The white, metallically glossy solid was dried for 3 days at 75° C. The product was a mixture of KSn$_2$F$_5$ and KSnF$_3$. (Determined by comparing known x-ray diffraction data).

| Yield: 7.7 g (sample number: AB001902) | | |
|---|---|---|
| DTA (differential thermoanalysis): | | |
| AB001901 | 351.5° C. | |
| AB001902 | onset 252.2 | max/min 266.4° C. |

EXAMPLE 3

Brazing Test on Aluminum

Angle made of aluminum 3003, base plate made of 3003. A defined quantity of potassium complex was rubbed onto the base plate (25×25 mm) using a few drops of isopropanol, covered with an angle (30°, 40 mm long) and pre-dried at approximately 200° C. This assembly was then subjected to a heat treatment (200–605° C.) in a laboratory furnace located under N$_2$ protective gas, corresponding to the known Nocolok CAB (controlled atmosphere brazing). The results are shown in Table 1.

TABLE 1

| Flux, weighed portion | 5 g/m$^2$ | 7 g/m$^2$ |
|---|---|---|
| AB001901 | 10 g/m$^2$ | 10 g/m$^2$ |
|  | not brazed | very well brazed |
|  | 580° C., 6 minutes | 610° C., 12 minutes |
| AB001902 | not brazed | 10–15 g/m$^2$ |
|  |  | brazed 600° C. |

EXAMPLE 4

Production of Cesium Fluorostannate

Reaction:

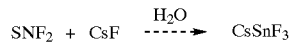

$$SNF_2 + CsF \xrightarrow{H_2O} CsSnF_3$$

| Batch: 0.1 mole | |
|---|---|
| SnF$_2$ (99%, Aldrich) | 0.1 mole = 15.67 g |
| CsF (99.8%, Chempur) | 0.1 mole = 15.19 g |
| CD water | ~50 ml |

Procedure:

15.67 g SnF$_2$ was placed in a plastic beaker and dissolved in 35 ml CD water (the solution was turbid). The solution was heated to 60° C. 15.19 g CsF was dissolved in 15 ml CD water and metered into the SnF$_2$ solution. The solution was stirred at 60° C. for 1.5 hours. After 1.5 hours, the heating was stopped and stirring was continued for 1 hour (no precipitation). The batch was placed in the furnace for 3 days and the CD water was evaporated at 80° C.

Yield: 30.88 g (sample number AB001802)

Analysis results:

DTA: 533.3° C.

EXAMPLE 5

Brazing Test on Aluminum

Angle made of aluminum 3003, base plate made of 3003. A defined quantity of cesium complex was rubbed onto the base plate (25×25 mm) using a few drops of isopropanol, covered with an angle (30°, 40 mm long) and pre-dried at approximately 200° C. This assembly was then subjected to a heat treatment (200–605° C.) in a laboratory furnace located under N$_2$ protective gas, corresponding to the known Nocolok CAB (controlled atmosphere brazing). The results (and those using other Al alloys) are shown in Table 2.

TABLE 2

| Experiment No. Flux | 7 g/m$^2$ Al 3003 | 5 g/m$^2$ Al plated | 10 g/m$^2$ Al 6063 plated | 15 g/m$^2$ Al 6063 plated |
|---|---|---|---|---|
| AB001802 CsSnF3 | 15 g/m$^2$ very well brazed 610° C., 5 minutes | very well brazed, 100% 610° C., 4 minutes | very well brazed, 100% 610° C., 5 minutes | very well brazed, 100% 610° C., 5 minutes |

Al 3003: Mg-free
Al 6063: 0.6% Mg

The foregoing description and examples have been set forth merely to illustrate the invention and are not intended to be limiting. Since modifications of the described embodi-

What is claimed is:

1. In a method of brazing or soldering components made of aluminum or an aluminum alloy, the improvement comprising applying to at least one of said components an effective fluxing amount of a fluxing agent comprising at least one alkali metal fluorostannate,
wherein said fluxing agent is applied in an amount of from 2 to 40 grams per square meter of component surface area, and
wherein said fluxing agent consists essentially of particles having an average particle diameter in the range from 8 to 20 μm and is applied to components to be brazed or soldered by dry fluxing, or
wherein said fluxing agent consists essentially of particles having an average particle diameter in the range from 3 to 10 μm and is a applied by wet fluxing as a slurry in water or an organic liquid.

2. A method according to claim 1, wherein said alkali metal fluorostannate comprises potassium fluorostannate.

3. A method according to claim 1, wherein said fluxing agent comprises cesium fluorostannate.

4. A method according to claim 1, wherein said fluxing agent comprises potassium and cesium fluorostannates.

5. A method according to claim 1, wherein said fluxing agent is applied by dry fluxing.

6. A method according to claim 1, wherein said fluxing agent is applied by wet fluxing.

7. A method according to claim 1, wherein said method is a method of solder-free brazing or soldering, and said fluxing agent comprises an effective fluxing amount of at least one alkali metal fluorostannate selected from the group consisting of potassium fluorostannate and cesium fluorostannate.

8. A method according to claim 7, wherein said fluxing agent further comprises at least one fluorosilicate selected from the group consisting of potassium fluorosilicate and cesium fluorosilicate.

9. A method according to claim 1, wherein said fluxing agent further comprises at least one fluoroaluminate selected from the group consisting of potassium fluoroaluminate and cesium fluoroaluminate.

10. A method according to claim 1, wherein said fluxing agent further comprises at least one fluorozincate selected from the group consisting of potassium fluorozincate and cesium fluorozincate.

11. A method according to claim 1, wherein said fluxing agent comprises 5 to 100 weight-percent of at least one fluorostannate selected from the group consisting of potassium fluorostannate and cesium fluorostannate, 0 to 95 weight-percent of at least one hexafluorosilicate selected from the group consisting of potassium hexafluorosilicate and cesium hexafluorosilicate, 0 to 95 weight-percent of at least one fluoroaluminate selected from the group consisting of potassium fluoroaluminate and cesium fluoroaluminate, and 0 to 95 weight-percent of at least one fluorozincate selected from the group consisting of potassium fluorozincate and cesium fluorozincate.

12. A method according to claim 1, wherein or soldering is effected at a temperature of from 270 to 620° C.

13. A method according to claim 12, wherein brazing or soldering is effected at a temperature of from 270 to 580° C.

14. A fluxing agent comprising 5 to 95 weight-percent of at least one fluorostannate selected from the group consisting of potassium fluorostannate and cesium fluorostannate, wherein said fluxing agent consists essentially of particles having an average particle diameter of from 8 to 20 μm.

15. A fluxing agent according to claim 14, further comprising at least one hexafluorosilicate selected from the group consisting of potassium hexafluorosilicate and cesium hexafluorosilicate.

16. A fluxing agent according to claim 14, further comprising at least one fluoroaluminate selected from the group consisting of potassium fluoroaluminate and cesium fluoroaluminate.

17. A fluxing agent according to claim 14, further comprising at least one fluorozincate selected from the group consisting of potassium fluorozincate and cesium fluorozincate.

18. A fluxing agent comprising 5 to 95 weight percent of a fluorostannate selected from the group consisting of potassium fluorostannate and cesium fluorostannate, wherein said fluxing agent consists essentially of particles having an average particle diameter of from 3 to 10 μm.

19. A fluxing agent according to claim 18, further comprising a hexafluorosilicate selected from the group consisting of potassium hexafluorosilicate and cesium hexafluorosilicate.

20. A fluxing agent according to claim 18, further comprising a fluoroaluminate selected from the group consisting of potassium fluoroaluminate and cesium fluoroaluminate.

21. A fluxing agent according to claim 18, further comprising a fluorozincate selected from the group consisting or potassium fluorozincate and cesium fluorozincate.

22. A fluxing agent comprising 5 to 95 weight-percent of at least one fluorostannate selected from the group consisting of potassium fluorostannate, and 1 to 30 weight-percent of at least one substance selected from the group consisting of aluminum, metal powders which form an aluminum soldering alloy, binders, water, and organic liquids.

23. A fluxing agent according to claim 22, further comprising a hexafluorosilicate selected from the group consisting of potassium hexafluorosilicate and cesium hexafluorosilicate.

24. A fluxing agent according to claim 22, further comprising a fluoroaluminate selected the group consisting of potassium fluoroaluminate and cesium fluoroaluminate.

25. A fluxing agent according to claim 22, further comprising a fluorozincate selected from the group consisting of potassium fluorozincate and cesium fluorozincate.

26. A fluxing agent according to claim 22, which comprises 1 to 30 weight-percent of a soldering alloy forming metal powder selected from the group consisting of silicon, germanium, zinc and copper.

* * * * *